(12) United States Patent
Arik et al.

(10) Patent No.: US 8,465,193 B1
(45) Date of Patent: Jun. 18, 2013

(54) FULLY PASSIVE DIFFUSER STACK FOR A BACKLIGHT

(75) Inventors: Engin B. Arik, Thousand Oaks, CA (US); Evgeni Y. Poliakov, Rancho Palos Verdes, CA (US)

(73) Assignee: Luminit LLC, Torrance, CA (US)

( * ) Notice: Subject to any disclaimer, the term of this patent is extended or adjusted under 35 U.S.C. 154(b) by 1044 days.

(21) Appl. No.: 12/256,280

(22) Filed: Oct. 22, 2008

Related U.S. Application Data

(60) Provisional application No. 60/981,717, filed on Oct. 22, 2007.

(51) Int. Cl.
*F21V 5/00* (2006.01)
(52) U.S. Cl.
USPC .......................................................... 362/618
(58) Field of Classification Search
USPC .......................................................... 362/618
See application file for complete search history.

(56) References Cited

U.S. PATENT DOCUMENTS

| 5,365,354 | A | 11/1994 | Jannson et al. |
| 5,534,386 | A | 7/1996 | Petersen et al. |
| 7,842,376 | B2 * | 11/2010 | Lu .................................. 428/172 |
| 2005/0088839 | A1 * | 4/2005 | Huang et al. .................... 362/31 |
| 2006/0291252 | A1 * | 12/2006 | Lim et al. ....................... 362/618 |

* cited by examiner

*Primary Examiner* — Laura Tso
(74) *Attorney, Agent, or Firm* — Morgan, Lewis & Bockius LLP

(57) ABSTRACT

A passive backlight film stack can be composed of several light shaping diffusers, which do not use brightness-enhancing films, light pipes or directional turning films. The passive diffuser stack can be used with direct-view backlights or with the diffuser films, each from 100 to 300 micrometers thick, stacked on top of one another. The passive stack assembly can be formed by two elliptical diffuser films (having different light distribution profiles in horizontal and vertical planes) and one circular diffuser film (with homogeneous distribution in both planes). Each film within the stack has a micro-relief surface diffuser pattern ranging from 5 to 200 microns on a rigid substrate achieved by means of single beam recording in photosensitive media. The light shaping diffusers in the proposed stack have special physical and geometrical characteristics.

25 Claims, 3 Drawing Sheets

FULLY PASSIVE DIFFUSER STACK FOR A BACKLIGHT

CROSS-REFERENCE TO RELATED APPLICATIONS

This application claims the benefit of U.S. Provisional Application No. 60/981,717 filed Oct. 22, 2007. This reference is incorporated by reference as if set forth fully herein.

BACKGROUND OF THE INVENTION

Field of the Invention

The proposed invention pertains to the field of diffuser assemblies for displays such as liquid crystal displays, fluorescent lamp-based and light-emitting diode television, light-emitting display assemblies and the like. More particularly, the invention pertains to a concept of a direct-view backlight assembly, which uses diffuser films without using so-called "gain" (G>1) films such as brightness enhancement films, directional turning films, or light pipes which presently have a high level of acceptance.

BRIEF SUMMARY OF THE INVENTION

A passive backlight film stack can be composed of several light shaping diffusers, which do not use brightness-enhancing films, light pipes or directional turning films. The passive diffuser stack can be used with direct-view backlights or with the diffuser films, each from 100 to 300 micrometers thick, stacked on top of one another. The passive stack assembly can be formed by two elliptical diffuser films (having different light distribution profiles in horizontal and vertical planes) and one circular diffuser film (with homogeneous distribution in both planes). Each film within the stack has a micro-relief surface diffuser pattern ranging from 5 to 200 microns on a rigid substrate achieved by means of single beam recording in photosensitive media. The films can be made of polyester, polycarbonate, acrylic, or similar plastic resin material. A bottom collector-diffuser light panel can be a support frame of approximately 2 mm thick, and is optional, and can also serve as a partial collimator and a homogenized diffuser to hide the effects of the source presence regardless of its nature and overall brightness. Both the panel and the light shaping diffusers in the proposed stack have special physical and geometrical characteristics and are manufactured by machine methods of rapid replication.

Accordingly, one aspect of the invention is a backlight system having a direct-view backlight, and two or more light shaping diffuser films, placed on each other.

Another embodiment of the invention is a backlight system that is a direct-view backlight with three light shaping diffuser films. Two of the light-shaping diffuser films have elliptical scattering profiles and one light-shaping diffuser film has a circular scattering profiles. The three films are arranged against each other in a stack in the order of: 1) elliptical, 2) elliptical, and 3) circular film so that the light enters via the first elliptical diffuser and then leaves via the last circular diffuser.

Yet another embodiment of the invention is a backlight system that is a direct-view backlight, having of three light shaping diffuser films, having two elliptical and one circular scattering radiation profiles, placed on each other, and arranged in the order of: 1) elliptical, 2) elliptical, and 3) circular film stack, with the first elliptical diffuser clear film side (substrate) facing the illuminator(s) and the clear side of the last, (circular, diffuser) facing away from the illuminator so that the light enters via the first elliptical diffuser and then leaves via the last circular diffuser.

Further embodiments of the invention are a backlight systems according to the prior three embodiments, having a collimator-diffusing support panel of 1 to 2 mm thickness, consisting of arrays of 50-550 microns diameter lenses and having a pre-diffused agent for the purpose of light collimation and pre-diffusion, with a lenslet lenticular screen imprinted on one side and being the first surface on which the light from the illuminator(s) is radiating, and serving as a support on which the entire diffuser film stack of claim 1 is placed and its glossy (opposite to lenslet lenticular) side facing the entering light.

Yet further embodiments of the invention are the backlight systems according to the prior four embodiments with two elliptical 60 degrees×1 degree full width half maximum (FWHM) angular scattering profile, coaxed with each other in the scattering directions, with the largest (60 degree) scattering directions running along the cross-section of the elongated sources, such as CCFL, for both elliptical diffusers, to maximize the spread and thus obscure the elongated sources.

Still yet further embodiments of the invention are the backlight systems according to the prior five embodiments using passive diffuser films of 100 to 150 microns on a clear film side, bearing a specific material profile, engineered by single-laser recording in holographic media, harnessing the light from the said light source to an exit of the display system as a viewing screen or in viewing directions, and each layer of the aforementioned diffuser film is manufactured by a UV rapid replication process in which a specific micro-relief pattern is imprinted on a transparent film.

For the systems above, the films can be manufactured by a UV rapid replication of a specific micro-relief pattern on a substrate by web-processing in which a drum embossed with all the necessary metal imprints by means of holographic recording and post-processing, and by illuminating said drum with UV light while pressing this drum against a substrate film to imprint said substrate with the surface micro-relief structure and being the integral part of the film, said substrate film having been prepared by surface coating curing UV resin with a refractive index in close proximity to that of the substrate.

Further, the backlight system can have the surface relief pattern of the films manufactured on both sides of a clear film by methods claimed in claims 6 and 7, thus creating a new film having micro-relief surface pattern on both sides of the clear film.

The backlight systems of the present invention can consist of fewer than three diffusive films in the assembly, with one diffuser combining functionality of the two diffusers described above, where at least one such diffuser has micro-relief layers on both sides of a clear film (substrate).

The backlight systems of the present invention can have a collimator-support panel as part of the assembly, whose collimating side bearing micron lens is manufactured by means of heat embossing and whose diffusion characteristics are obtained by mixing a diffusing agent of certain concentration into the panel plastic of the aforementioned collimator-support panel.

The backlight systems above can have a circular diffuser as a part of the assembly as a top, final layer, whose angular characteristics are determined by the desired final viewing area.

The backlight systems of the present invention can yet also have a light entering through the clear surface of an optional collimating-diffuser support panel and in the direction of the thickness of the panel, consisting of a specifically engineered panel with a thickness ranging from 1 to 2 mm.

The backlight systems of the present invention can have light entering through the clear surface of light shaping diffuser film, having 60 degrees×1 degree elliptical scattering pattern, and in the direction of the thickness of the film, with further propagation away from the illuminators and entering other films in the stack.

The backlight systems of the present invention can further have an integral surface relief holographic pattern of elliptical and circular configuration on one, or separate films with light shaping functions to homogenize (obscure) the illumination sources and to direct light to desired directions.

The backlight systems of the present invention can be used for direct-view backlights with different diverging sources such as CCFL, LEDs, laser diodes, Fluorescent lamps, near IR irradiators, and other sources.

The backlight systems of the present invention can have engineered surface relief pattern layers to direct light from the said above sources by means of effective light collection, harnessing, scattering, homogenizing, and propagating within the said backlight by means of the specific micro structural shapes and configurations of said engineered layer components.

Particular advantages are derived from such a diffuser, namely, thinner light shaping diffuser microstructures, which encapsulate the entire backlight stack for direct-view applications and the simplicity of present invention is characterized by the avoidance of any light pipes and/or brightness enhancing films. An engineered direct-view passive backlight stack achieves high-optical performance by effective light collection using a collimator-diffuser support film and high optical transmission and propagation through the microstructured diffusers.

BRIEF DESCRIPTION OF THE SEVERAL VIEWS OF THE DRAWINGS)

The aforementioned advantages of the present invention as well as additional advantages thereof, will be more fully understood as a result of a detailed description of a preferred embodiment and the following drawings in which.

DETAILED DESCRIPTION OF THE INVENTION

Figure 1:
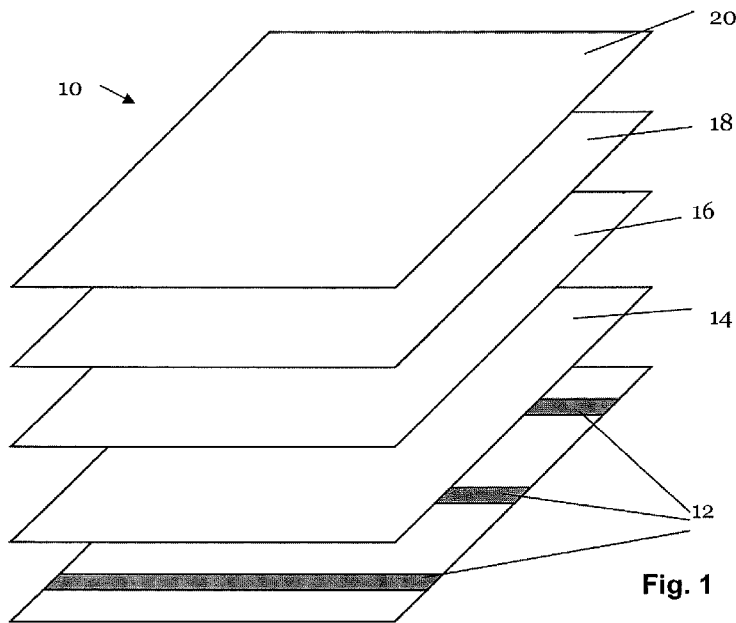
FIG. 1 is an illustration of a direct-view backlight assembly, which utilizes 50 to 150 micron thin microstructure diffuser films of elliptical and circular radiation patterns of FIG. 2, and the diffuser-collimator optional support plate of FIG. 3.

The present invention is a passive; no-gain (e.g. no BEF, or DBEF) based assembly 10 consisting of a plurality of diffuser films 14, 16, 18, 20 for direct-view backlit applications. The light shaping diffuser films 16, 18, 20 exhibit both elliptical 16, 18 and circular 20 scattering radiation patterns in the stack 10. The structure can have an optional diffuser-collimator support panel 14 having embossed lenslet microstructures (not illustrated) and thin diffuser films whose upper surface bears a relief microstructure pattern produced by means of holographic recording and subsequent fast machine replication. All the films 16, 18, 20 and the support panel 14 are preferably made from polyester, polycarbonate, acrylic or similar plastic resin materials.

The assembly 10 is intended to be placed over a source of illumination, and exemplarily a plane source or an array of sources 12 disposed in a plane. Light emitting diodes (LEDs), cold cathode fluorescent lights (CCFL) or other illumination sources can be used.

The embossed surface of the optional support diffused-collimator panel can face away from the illuminating source 14. The frame (not illustrated) for holding the panel can be mounted on support pins (typical TV application) or on the edges of the machined assembly. The embossed micro-lens array of the support panel 14 pre-collimates the light from the divergent source and minimizes the reflection losses to boost the optical transmission. The micro-lens geometrical parameters are specially designed and are of a size of 50-550 hundred microns.

In assembling the diffuser stack to the light source, a small portion of the reflected light from the backside of the panel (away from the diffuser stack) can be recovered with a bottom reflector assembled into the back side of the backlight. The bottom reflector can have a metallic coating made of Ag, Al, or similar alloy with a protective coating layer to avoid oxidation.

A diffusing agent can be used to diffuse the pre-collimated light and simplify the work for further diffusive layers, although the entire support panel is optional while all the other light shaping diffuser films can be mounted directly above the illumination source.

The diffuser stack consists of two diffusers with an elliptical scattering profile in x-y plane, located on the bottom assembly one after the other and above the optional support collimator-diffuser plate. A top diffuser with a circular radiation pattern completes the direct-view backlight. The elliptical diffuser closer to the light source microstructure is turned away from illuminator to achieve maximum throughput.

The optical performance of the light shaping diffuser has several purposes: to achieve an appropriate homogenization, achieve high optical transmission, and the spreading of the light fast enough so that the observer does not see the illuminator. The particular radiation pattern of an illuminator, the source grid, and the working distance of the backlight dictate the choice of micro-relief of the diffuser and its micro-relief position with respect to the source. Methods of making such diffusers are disclosed in U.S. Pat. Nos. 5,365,354 and 5,534,386 are fully incorporated by reference as if set forth in herein.

Figure 4:
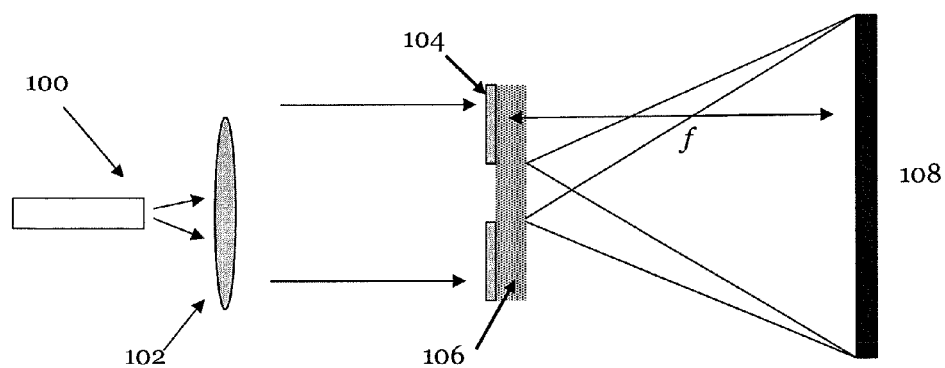
FIG. 4 is a schematic of the recording setup that can be used to make the diffusers in the present invention.

Being weakly diffractive optical elements (the light rays do not deviate very much from the original path), the diffusers exhibit scattering profile of a Gaussian distribution as shown FIG. 12 from U.S. Pat. No. 5,534,386. The diffuser surface roughness features on micro-scales are engineered by exposing the photosensitive medium to the light variations through the optical set-up in the FIG. 4 (also see FIG. 5a in U.S. Pat. No. 5,534,386).

A coherent light source, such as laser 100 passes through lens 102. The extent of the coherent light is then limited by a mask 104, and passed through a diffuser 106. The masked and diffused coherent light is then incident on the photosensitive medium 108.

Control of the final features is achieved through changing the working distance, the wavelength of the coherent light, and the aperture of the mask 104 in the set-up. The resultant surface micro-relief is the collection of symmetrical or asymmetrical curvatures as shown in FIG. 5B (for circular) and in FIG. 9F (for elliptical diffuser) of U.S. Pat. No. 5,534,386. The shapes of individual speckles (or lenslets) can be varied in both directions, resulting, if required, in an asymmetric pattern (for example, 60 degree×1 degree elliptical shape). The size of individual lenslets is given by the following dimensions:

$$\delta_x = 2\lambda f/h; \; \delta_y = 2\lambda f/w;$$

where $\delta_x$ and $\delta_y$ are the horizontal and vertical dimensions of the speckle, $\lambda$ is the wavelength of the coherent light, f is the focal distance of the system, and h and w are the geometrical height and width parameters of the mask.

The typical aspect ratios of the recorded structures are ~0.5-20 where the aspect ratios are defined as height over based of the structure ratio(z/(x,y)). The high-degree scattering angle diffusers bear smaller feature sizes than small scattering angle diffusers as the spatial frequencies of the former increase. The typical range is between 5-200 um micro-lenslet ensembles, with 200 um representing angles of 1-5 degrees and 2-5 um ensembles representing 60-80 degrees.

Exemplarily, for distant cold cathode fluorescent lights, which are thin Lambertian illuminators, two diffusers with a 60 degrees×1 degree half width full maximum (HWFM) elliptical light scattering profile can be used.

The substrates (clear, no micro-relief surface) are turned away from the light source, and a 60 degree (maximum diffusion) axis runs perpendicular to the length of CCFL.

The entire structure of the proposed backlight in this invention bears three passive diffuser films, two of 60 degrees×1 degree of scattering, and one circular diffuser regardless of the source illuminator, working distance, and the grid. The micro-relief microstructure pattern of the top (last) diffuser always faces the source, while the micro-relief structure of the middle diffuser may face towards or away from the source.

Depending on the substrate and resin material used, optical transmission of said diffusers can range within 90-96% with an option of having two micro-relief surface patterns on both sides of the film (front and back), so that the clear substrate is sandwiched between the two micro-relief patterns. This option is extremely useful, if there is a need to cut down the efficient working distance.

The mechanical frame, support diffuser-collimator film, mounting pins, or all of the aforementioned provide the physical rigidity of the proposed backlight.

Referring to the accompanying drawings, as shown in FIG. 1, the general configuration of the fully passive diffuser backlight utilizes the maximum number of four films: an optional diffuser-collimator support film and three diffuser films of elliptical and circular angular characteristics, with one side of each being a plain resin substrate and the other side being an integral surface relief diffuser profile of holographic nature. The total thickness of the optional plate can be any size, though it is anticipated that typical installations would use plates having a thickness of from 1 to 3 mm, preferably from 1 to 2 mm. Each diffuser film's thickness can be in the range of 50 to 300 microns, preferably 50 to 150 microns, resulting in an entire stack that does not exceed 4 mm. The particular surface relief profile of each diffuser film as well as the microstructure profile of the support panel is determined by the radiation characteristics of illuminators, their geometry, working distance, and the location of the light sources. These parameters are within the ability of those of ordinary skill in the art to achieve without undue experimentation.

FIG. 1 provides an overview of the direct-view backlight, in which the source 12 (illuminator) is located below the film stack 13. The source 12 is assumed to be non-collimated and can be any light source, but exemplarily is an array of LED, CCFL, laser diodes, electroluminescent lamps, Lambertian emitter(s), or any source of non-collimating, diverging light. Beneath the illuminator, there can be a common reflector, made of Al, Ag, or similar reflective material. The reflector's function is to re-collect the light rejected from the main pass (through the diffuser stack) and to recycle it back into the system. The entire backlight stack of aforementioned films is supported either by an optional diffuser-collector panel, or by a rigid mechanical frame, or by the typical support pins used in the television industry.

The diverging light from an illuminator (or illuminators) positioned above the reflector illuminates the clear side of an optional support panel and then sub-focuses and pre-diffuses light on the first surface of the diffuser film. Incoming light faces the clear side of the film substrate which has a diffuser with a with a 60 degrees×1 degree scattering radiation pattern on the other side. (For typical CCFL geometry, the bottom diffuser film has an elliptical, 60 degrees×1 degree configuration with 1 degree spread running parallel to elongated CCFL rods, while exhibiting a 60 degree full width half maximum (FWHM) angular pattern in orthogonal, perpendicular to the CCFL rod length, direction, e.g., along the rod cross section). The second diffuser film, which is also elliptical 60 degrees×1 degree FWHM, further increases the angular spread across the CCFL rod cross-section while maintaining or slightly increasing the angular spread along CCFL length. (The planes of scattering are co-oriented for both of the elliptical diffusers: 60 degree FWHM coincides with 60 FWHM and are running along rod's cross section). The final, third diffuser is facing the front of the screen with its clear (substrate) side (e.g., meeting the light direction by the diffuser side), and is circular (i.e., its angular scattering profile is uniform in horizontal and vertical directions) to provide the final screen angular radiation pattern for the direct-view screen, which is intended to be presented in this invention.

Figure 2A:
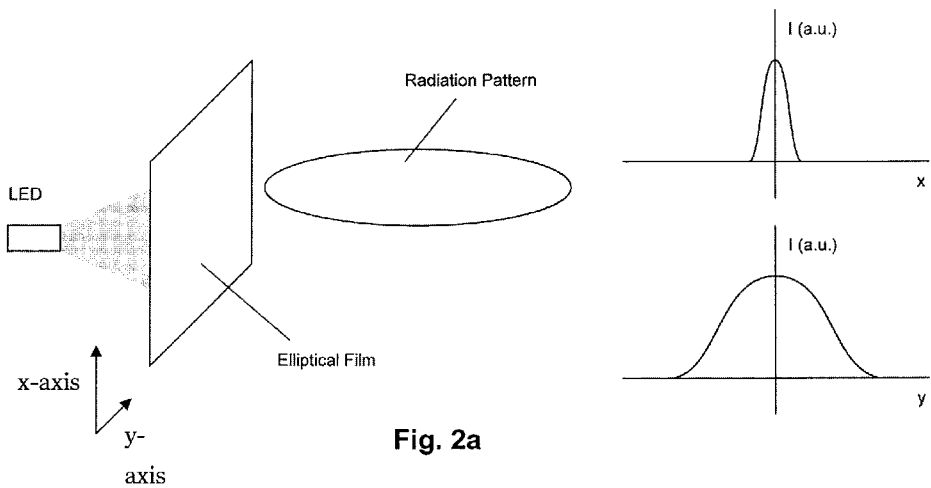
FIG. 2 is an illustration of a holographic light shaping diffuser of a) elliptical and b) circular angular radiation patterns adopted for a fully passive direct-view backlight.
Figure 2B:
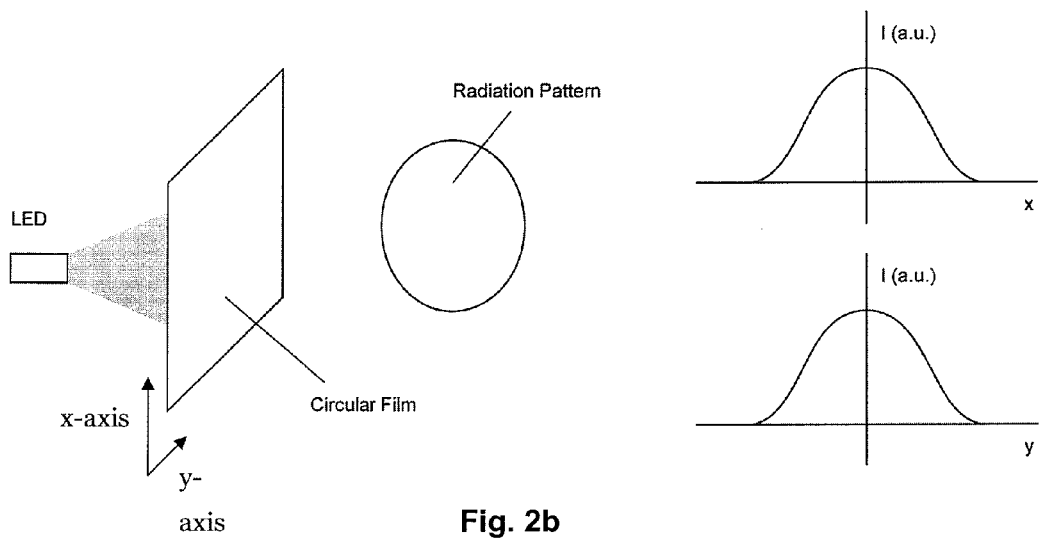

FIG. 2 illustrates the scattering performance of the 60 degrees×1 degree elliptical diffuser film with a micro-relief pattern of holographic nature. Depending on material micro-relief patterns (individual lenslets of 5-200 micron size) obtained during the complex process of holographic recording, the aforementioned elliptical film diffuses the light in two orthogonal planes providing different scattering profile distributions. The scattering diffuser profile in a particular plane is pre-determined by the collection and shape of the holographic lenslets.

Figure 3A:
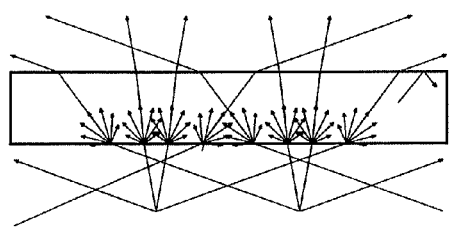
FIGS. 3a-b outlines a drawing of an optional collimator-diffuser stack with the advantages of light harnessing for such a hybrid (lens+diffuser) panel (3a) over a conventional support panel for a Lambertian source, such as a CCFL (3b).
Figure 3B:
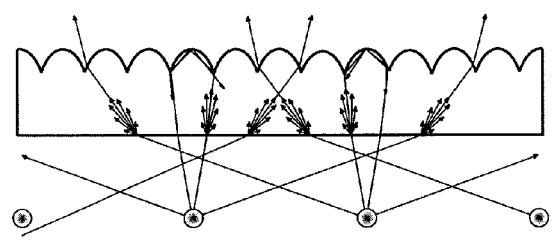

FIG. 3 depicts the advantages of the optional support panel: the light pre-collimation from the divergent source; the minimizing of reflection losses as seen in FIG. 3(a) in which the red rays are escaping the conventional backlight main path for critical angles; and the boosting of light transmission (75% versus 50-60% in conventional backlight assemblies). Although the correct back panel design is most critical for CCFL sources, as depicted in FIG. 3, it is equally important for less divergent LEDs. The diffuser agent is used to pre-diffuse and decrease the scattering angles of further diffusive layers. This element of the entire backlight is most critical because: it is adjacent to the LED array and reflector and it serves the beginning of the optical film backlight train.

The invention can also be implemented as with backlight system consisting of diverging illuminating sources. The backlight would have a reflector bearing aluminum, silver or similar reflective coating. There would also be a backlight support diffuser-collimating film (which could be replaceable by support pins or rigid mechanical frame with extension). The two elliptical diffuser films of 60 degrees×1 radiation degree pattern could run in the parallel orientation (their axes of spread are parallel to each other), and the final circular diffuser.

The invention could also be implemented with a backlight system consisting of entire passive stack of optical films, two elliptical and one circular angular pattern configuration diffusers with an optional support panel, and without any brightness enhancement films, either directional or bidirectional, used for direct-view backlight applications.

The invention can also be implemented as a backlight system, where 60 degree (FWHM) spread of light runs across the cross-section of elongated CCFL sources, and both of the elliptical spreads are co-oriented.

Manufacturing of the backlight system of diffuser films is by UV rapid replication in which a specific micro-relief pattern is imprinted on a transparent film substrate by web processing with a drum imprinted with all the necessary metal profiles of the micro-relief pattern that is illuminated with UV light as it is pressed against the substrate. The film substrate is preprocessed by coating the surface with curing UV resin. The UV resin must have a refractive index in close proximity to that of the substrate so that the resulting micro-relief pattern replicated on the substrate will be an integral part of the film. Appropriate techniques are disclosed in U.S. Pat. No. 5,922,238 and are fully incorporated by reference as if set forth in herein.

A backlight system having an optional support panel manufactured by means of hot embossing by pressing the desired lenslet collimating array against the hot mold with the original ("mother") structure of such micro-lenses. Appropriate techniques are disclosed in U.S. Pat. No. and are fully incorporated by reference as if set forth in herein.

A backlight system having integral surface diffuser elements with the required surface relief pattern can be made by means of holographic recording with the light shaping functions to obscure the diverging source light and redistribute it within the assembly to provide an adequate level of homogenization. Appropriate techniques are disclosed in U.S. Pat. No. 5,922,238 and are fully incorporated by reference as if set forth in herein.

The disclosed embodiments of these relevant skills in the art of the proposed backlight system can be modified and added to for various perceived applications. Accordingly, it will be understood that the scope hereof is not to be limited to these embodiments.

We claim:

1. A backlight system, comprising:
a direct-view backlight, comprising three light shaping diffuser films, comprising two elliptical and one circular scattering radiation profiles, placed on each other, and arranged as an elliptical, elliptical, and circular film stack such that the light enters via the first elliptical diffuser and then leaves via the last circular diffuser.

2. A backlight system, comprising:
a direct-view backlight, comprising three light shaping diffuser films, comprising two elliptical and one circular scattering radiation profiles, placed on each other, and arranged as an elliptical, elliptical, and circular film stack, with the first elliptical diffuser clear film side substrate facing at least one illuminator and the clear side of the last, circular, diffuser facing away from the at least one illuminator such that the light enters via the first elliptical diffuser and then leaves via the last circular diffuser.

3. The backlight system of claim 2, further comprising:
a collimator-diffusing support panel of 1 to 2 mm thickness with arrays of 400-900 hundred micron lenses and having a pre-diffused agent for the purpose of light collimation and pre-diffusion, with a lenslet lenticular screen imprinted on one side and being the first surface on which the light from the at least one illuminator is radiating, and configured as a support on which the entire diffuser film stack is placed and its glossy side opposite to lenslet lenticular side facing the entering light.

4. The backlight of claim 2, wherein, when there is at least one elongated light source, the two elliptical films each comprise a 60 degrees×1 degree full width half maximum angular scattering profile, coaxed with each other in the scattering directions, with the largest scattering directions running along the cross-section of the elongated sources, such as CCFL, for both elliptical diffusers, to maximize the spread and obscure the elongated sources.

5. The backlight system of claim 2, further comprising:
at least one passive diffuser film of 100 to 150 microns on a clear film side, bearing a predetermined material profile, engineered by holographic recording, harnessing the light from the said light source to an exit of the display system as a viewing screen or in viewing directions,
wherein each layer of the diffuser film is manufactured by a UV rapid replication process in which a micro-relief pattern is imprinted on a transparent film.

6. The backlight system of claim 1, wherein the diffuser layers each comprise a micro-relief pattern on a substrate by web-processing by a drum embossed with metal imprints by holographic recording and post-processing, and by illuminating the drum with UV light while pressing the drum against a substrate film to imprint the substrate with the surface micro-relief structure and being the integral part of the film, the substrate film having been prepared by surface coating curing UV resin with a refractive index in close proximity to that of the substrate.

7. The backlight system of claim 1, wherein a surface relief pattern of the diffuser film is manufactured on both sides of a clear film, creating a film comprising a micro-relief surface pattern on both sides of the clear film.

8. The backlight system in claim 2, comprising fewer than three diffusive films in the assembly, with one diffuser combining functionality of the two diffusers, where at least one such diffuser has micro-relief layers on both sides of a clear film substrate and the micro-relief layers.

9. The backlight system of claim 1, further comprising a collimator-support panel comprising a collimating side bearing micron lens manufactured by heat embossing and comprising diffusion characteristics obtained by mixing a diffusing agent of certain concentration into the panel plastic of the collimator-support panel.

10. The backlight system of claim 1, further comprising a circular diffuser as part of the assembly as a top, final layer, whose angular characteristics are determined by the desired final viewing area.

11. The backlight system of claim 1, further comprising a light entering through the clear surface of an optional collimating-diffuser support panel and in the direction of the thickness of the panel, comprising a panel with a thickness ranging from 1 to 2 mm.

12. The backlight system of claim 1, further comprising a light entering through the clear surface of light shaping diffuser film, having 60 degrees×1 degree elliptical scattering pattern, and in the direction of the thickness of the film, with further propagation away from the illuminators and entering other films in the stack.

13. The backlight system of claim 1, further comprising:
- an integral surface relief holographic pattern of elliptical and circular configuration on one; or
- separate films with light shaping functions to homogenize the illumination sources and to direct light to desired directions.

14. The backlight system of claim 1, further comprising a plurality of diverging sources, each source comprising one or more of: a CCFL, an LED, a laser diode, a fluorescent lamp, and a near IR irradiator.

15. The backlight system of claim 1, further comprising engineered surface relief pattern layers to direct light from the sources by effective light collection, harnessing, scattering, homogenizing, and propagating within the backlight by the specific micro structural shapes and configurations of the engineered layer components.

16. The backlight of claim 2, wherein, when there is at least one elongated light source, the two elliptical films each comprise a 60 degrees×1 degree full width half maximum angular scattering profile, coaxed with each other in the scattering directions, with the largest scattering directions running along the cross-section of the elongated sources, such as CCFL, for both elliptical diffusers, to maximize the spread and obscure the elongated sources.

17. The backlight system of claim 2, wherein the diffuser layers each comprise a micro-relief pattern on a substrate by web-processing by a drum embossed with metal imprints by holographic recording and post-processing, and by illuminating the drum with UV light while pressing the drum against a substrate film to imprint the substrate with the surface micro-relief structure and being the integral part of the film, the substrate film having been prepared by surface coating curing UV resin with a refractive index in close proximity to that of the substrate.

18. The backlight system of claim 2, wherein a surface relief pattern of the diffuser film is manufactured on both sides of a clear film, creating a film comprising a micro-relief surface pattern on both sides of the clear film.

19. The backlight system of claim 2, further comprising a collimator-support panel comprising a collimating side bearing micron lens manufactured by heat embossing and comprising diffusion characteristics obtained by mixing a diffusing agent of certain concentration into the panel plastic of the collimator-support panel.

20. The backlight system of claim 2, further comprising a circular diffuser as part of the assembly as a top, final layer, whose angular characteristics are determined by the desired final viewing area.

21. The backlight system of claim 2, further comprising a light entering through the clear surface of an optional collimating-diffuser support pane and in the direction of the thickness of the panel, comprising a panel with a thickness ranging from 1 to 2 mm.

22. The backlight system of claim 2, further comprising a light entering through the clear surface of light shaping diffuser film, having 60 degrees×1 degree elliptical scattering pattern, and in the direction of the thickness of the film, with further propagation away from the illuminators and entering other films in the stack.

23. The backlight system of claim 2, further comprising:
- an integral surface relief holographic pattern of elliptical and circular configuration on one; or
- separate films with light shaping functions to homogenize the illumination sources and to direct light to desired directions.

24. The backlight system of claim 2, further comprising a plurality of diverging sources, each source comprising one or more of: a CCFL, an LED, a laser diode, a fluorescent lamp, and a near IR irradiator.

25. The backlight system of claim 2, further comprising engineered surface relief pattern layers to direct light from the sources by effective light collection, harnessing, scattering, homogenizing, and propagating within the backlight by the specific micro structural shapes and configurations of the engineered layer components.

* * * * *